United States Patent [19]
Geyer

[11] 3,738,459
[45] June 12, 1973

[54] DEVICE FOR CONTROLLED LOWERING OF MASS LOAD
[75] Inventor: Howard M. Geyer, Dayton, Ohio
[73] Assignee: Pneumo Dynamics Corporation, Cleveland, Ohio
[22] Filed: Apr. 26, 1971
[21] Appl. No.: 137,228

[52] U.S. Cl................ 192/8 R, 192/15 R, 192/44
[51] Int. Cl.......................................... F16d 87/10
[58] Field of Search................ 192/44 R, 15 R, 8 R

[56] References Cited
UNITED STATES PATENTS
2,424,912   7/1947   Briggs et al. .................. 192/8 R
2,969,222   1/1967   Sears............................. 192/8 R Primary Examiner—Charles J. Myhre
Assistant Examiner—Randall Heald
Attorney—Stephen M. Mihaly

[57] ABSTRACT

Device consists of a linear actuator having a direction sensitive clutch engageable with a load-energized friction bearing surface during movement in the load-aiding direction for eliminating back driving by the load with no decrease in the forward efficiency of the device. Bi-directional braking may also be provided for preventing back driving of the actuator in either direction.

10 Claims, 4 Drawing Figures

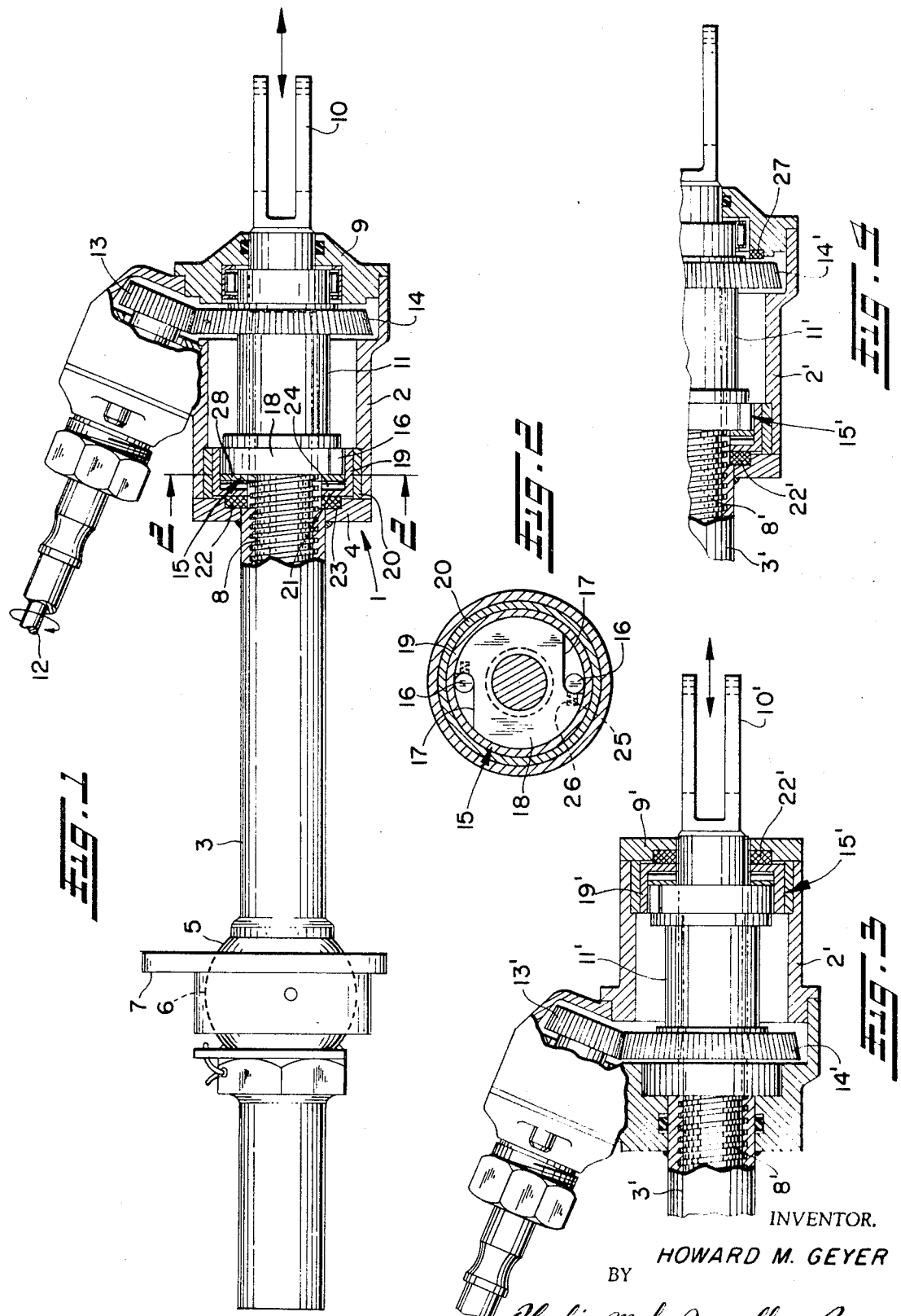

3,738,459

DEVICE FOR CONTROLLED LOWERING OF MASS LOAD

This invention relates generally as indicated to a device for controlled lowering of mass loads, and more particularly to a linear actuator device such as may be used as a cowling door actuator for jet engines and the like.

Linear actuators which require moderate to high mechanical efficiency during movement in opposition to the applied load oftentimes employ ball screws or high lead acme screws for converting a rotary input drive motion into translating or linear movement of the load. The primary objection to the use of such screws is that they are subject to back driving by the load, whereby undesirable loss of position control of the load may occur during movement in the load-aiding direction.

The subject invention relates to certain improvements in such linear actuator devices for preventing undesirable back driving or overhauling of the applied load without loss of efficiency during movement against the opposing load, which is a principal object of the subject invention.

Another object is to provide such an actuator device which prevents back driving by overhauling load applications in one or both directions.

A further object is to provide such an actuator device which requires a net positive input torque to be applied to move the actuator in the load-aiding direction.

These and other objects of the present invention may be achieved by providing an actuator with a direction sensitive clutch which engages a load-energized friction bearing surface when the resultant external load acting on the actuator is in the load overhauling or aiding direction for absorbing the energy of the load tending to move the actuator in the back driving or overhauling direction. The energy absorption capability of the friction bearing surface is directly proportional to the applied load, whereby loss of position control may be prevented in the load-aiding direction by requiring a net positive input torque to be applied to the screw shaft to move the actuator in the load-aiding direction.

During movement of the actuator against the applied load, the directional clutch disengages the friction bearing surface for high efficiency operation in the load opposing direction. Bi-directional braking may also be provided so that mass load or overhauling load applications requiring over-center motion may be prevented from back driving the actuator in either direction.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In the annexed drawings:

FIG. 1 is a fragmentary longitudinal section through a preferred form of linear actuator device in accordance with this invention;

FIG. 2 is a transverse section through the linear actuator device of FIG. 1, taken on the plane of the line 2—2 thereof;

FIG. 3 is a fragmentary longitudinal section through a modified form of actuator device in accordance with this invention; and FIG. 4 is a fragmentary longitudinal section through still another form of actuator device in accordance with this invention.

Referring now in detail to the drawings and first especially to FIG. 1, there is shown a linear actuator 1 in accordance with this invention including a housing 2 having a tubular sleeve 3 projecting from one end 4 thereof. Attached to the outer end of the tubular sleeve 3 is a ball mount 5 received in a socket 6 of a mounting bracket 7 for providing a swivel connection for the actuator 1 when fastened to a stationary support. Contained within the tubular sleeve 3 and housing 2 is a screw shaft 8, which may either be a ball screw type or high lead acme screw type, having one end projecting outwardly from the other end 9 of the housing and having a clevis mount 10 on the projecting end of the screw for attachment to a load which prevents rotation of the screw.

Also contained within the housing 2 is a ball nut 11 having threaded engagement with the screw shaft 8. The nut 11 may be spur gear driven by rotation of an input shaft 12 having a spur gear 13 on the inner end thereof in meshing engagement with a spur gear 14 on one end of the nut thus to cause linear movement of the screw shaft 8 relative to the nut 11 and housing 2. Attached to the other end of the nut 11 is a one-way direction sensitive clutch 15 which as more clearly shown in FIG. 2 may comprise a plurality of clutch rollers 16 contained in cam slots 17 in the outer periphery of a cylindrical clutch element 18. Surrounding the cylindrical clutch element 18 is a sleeve 19 rotatably received in a bushing 20 adjacent the end 4 of the housing 2. However, rotation of the sleeve 19 is retarded by frictional engagement of an inturned flange 21 on the outer end of the sleeve with a large friction bearing 22 contained in a recess 23 in the housing end wall 4 surrounding the screw shaft 8, for a purpose to be fully described hereafter.

Interposed between the inturned flange 21 and a thrust washer 28 adjacent the outer end of the clutch element 18 are a plurality of needle thrust bearings 24. Accordingly when the nut 11 is rotated in a clutch disengaging direction causing linear outward movement of the screw shaft 8 against a compression load, the nut 11 and clutch element 18 are free to rotate relative to the sleeve, and any thrust loads acting on the screw shaft 8 in opposition to such linear outward movement are taken by the needle bearings 24 for high efficiency operation.

The direction-sensitive clutch 15 prevents back driving or overhauling of the actuator 1 by the applied load in the opposite direction, since linear inward movement of the screw shaft rotates the nut 11 and clutch element 18 in the reverse direction causing the clutch rollers 16 to move outwardly into wedging engagement between the cam surfaces 17 on the clutch element and the inner periphery of the sleeve 19. Helical springs 25 disposed in recesses 26 in the clutch element 18 assist in urging the clutch rollers 16 outwardly along the cam surfaces for maintaining a driving connection between the sleeve 19 and clutch element 18 during rotation of the clutch element in the clutch engaging direction.

With a driving connection between the sleeve 19 and clutch element 18, there is a resistance to rotation of the clutch element 18 which resists linear inward movement of the screw shaft 8 because of the frictional contact of the inturned flange 21 on the sleeve 19 with the large friction bearing 22. The friction bearing 22 may be made large enough to absorb all of the energy due to back driving or overhauling by the load, since the energy absorption capability of the large friction bearing is directly proportional to the applied load in the overhauling direction. Thus, linear inward movement of the screw shaft 8 may be prevented by the one-way clutch 15 and friction bearing 22 except when a net positive input torque is applied to the nut 11 by the input shaft 12 for positive control of the screw shaft 8 during linear inward movements as well.

If the prevailing load acting on the actuator is in tension rather than compression, the actuator connections may be reversed or the one-way clutch 15', sleeve 19', and friction bearing 22' may be located at the other end of the housing 2' as shown in FIG. 3 to eliminate any back driving tendency in the linear outward direction with no decrease in efficiency during linear inward movement.

Moreover, bi-directional braking may also be provided so that mass load or overhauling load applications requiring over-center motion may be prevented from back driving in either direction by providing axial freedom of the drive gear 14' and placing a large friction bearing 27 at the other end of the housing 2' as well as shown in FIG. 4 for frictional engagement by the outer end of the drive gear 14' if the load shifts for example from a compression load to a tension load. Otherwise, the details of construction and operation of the linear actuator of the FIG. 4 embodiment are substantially identical to the linear actuators previously described, and accordingly the same reference numerals followed by a prime symbol are used to designate like parts.

From the foregoing, it will now be apparent that the linear actuators of the present invention effectively eliminate any back driving tendency of the load in one or both directions while providing high efficiency during movement of the actuator against the opposing load. The resistance to movement of the actuator in the load-aiding direction is directly proportional to the applied load, whereby a net positive input torque may be required to move the actuator in the load-aiding direction. In each of the embodiments disclosed, the nut is rotatable and the screw is fixed against rotation. However, it will be apparent that the same principles are applicable where either the nut or the screw is the rotating member.

The embodiments of the invention in which an exclusive property or privilege is claimed are defined as follows:

1. A linear actuator comprising a housing, a screw shaft extending from said housing, a nut having threaded engagement with said screw shaft, means for rotating said nut relative to said screw shaft for effecting linear movement of said screw shaft, one-way clutch means attached to one end of said nut for rotation therewith, and friction means engageable by said one-way clutch means for resisting rotation of said nut in one direction, said one-way clutch means being freely rotatable with respect to said friction means in the reverse direction.

2. The actuator of claim 1 wherein said friction means comprises a rotatable sleeve surrounding said one-way clutch means and driven thereby during rotation of said nut in one direction but not in the other direction, and a friction bearing fixed with respect to said housing engageable by said sleeve to provide resistance to turning of said sleeve.

3. The actuator of claim 2 wherein said friction bearing is fixed within said housing adjacent one end thereof, and said rotatable sleeve has an inturned flange in contact with said friction bearing.

4. The actuator of claim 3 further comprising antifriction bearings interposed between said inturned flange and clutch means to permit free rotation of said clutch means relative to said sleeve in the non-engaging direction of said clutch means.

5. The actuator of claim 3 wherein said clutch means drivingly engages said sleeve during rotation in a direction causing linear inward movement of said screw shaft for providing resistance to turning of said screw shaft when an applied load acting on the end of said screw shaft urges said screw shaft inwardly, said friction bearing being at the end of said housing furthest from the applied load.

6. The actuator of claim 3 wherein said clutch means drivingly engages said sleeve during rotation in a direction causing linear outward movement of said screw shaft for providing resistance to turning of said screw shaft when an applied load acting on the end of said screw shaft urges said screw shaft outwardly, said friction bearing being at the end of said housing closest to the applied load.

7. A linear actuator comprising a housing, a screw shaft extending from said housing, a nut having threaded engagement with said screw shaft, means for rotating said nut relative to said screw shaft for effecting linear movement of said screw shaft, one-way clutch means attached to one end of said nut for rotation therewith, and friction means engageable by said one-way clutch means for resisting rotation of said nut in one direction, said one-way clutch means being freely rotatable with respect to said friction means in the reverse direction, said friction means comprising a rotatable sleeve surrounding said one-way clutch means and driven thereby during rotation of said nut in one direction but not in the other direction, and a friction bearing fixed with respect to said housing engageable by said sleeve to provide resistance to turning of said sleeve, said friction bearing being fixed within said housing adjacent one end thereof, and said rotatable sleeve having an inturned flange in contact with said friction bearing, and an additional friction bearing adjacent the other end of said nut for engagement thereby upon a reversal in the direction of the applied load to provide bidirectional braking.

8. The actuator of claim 7 wherein said means for rotating said nut comprises a rotary input shaft, and gearing on said input shaft and nut for driving said nut during rotation of said input shaft, said gearing on said nut being engageable with said additional friction bearing upon a reversal in the direction of the applied load as aforesaid.

9. The actuator of claim 7 further comprising antifriction bearings interposed between said inturned flange and clutch means to permit free rotation of said clutch means relative to said sleeve in the non-engaging direction of said clutch means.

10. The actuator of claim 7 wherein said friction bearing provides a resistance to turning of said sleeve directly proportional to an applied load acting on the end of said screw shaft urging said inturned flange into frictional engagement with said friction bearing.

* * * * *